A. DRESHER.
FISH STOP.
APPLICATION FILED FEB. 27, 1918.
1,291,445.
Patented Jan. 14, 1919.
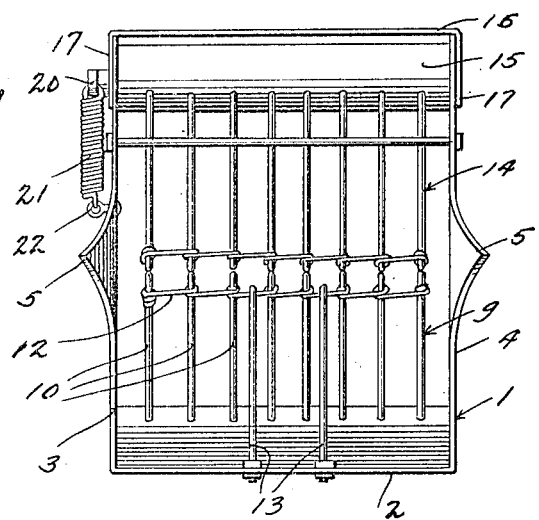
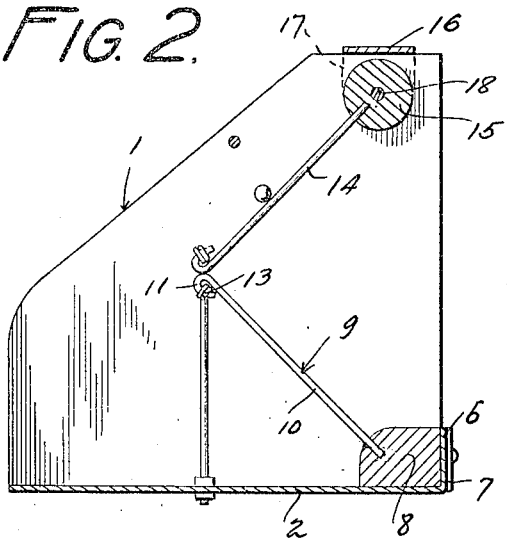
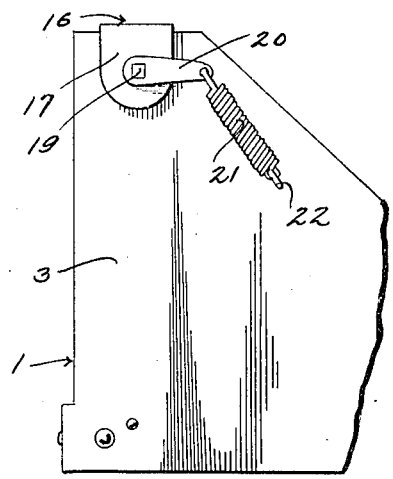
WITNESSES
INVENTOR
Andrew Dresher
BY
ATTORNEY

UNITED STATES PATENT OFFICE.

ANDREW DRESHER, OF WAPAKONETA, OHIO.

FISH-STOP.

1,291,445.

Specification of Letters Patent.

Patented Jan. 14, 1919.

Application filed February 27, 1918. Serial No. 219,462.

*To all whom it may concern:*

Be it known that I, ANDREW DRESHER, a citizen of the United States, residing at Wapakoneta, in the county of Auglaize and State of Ohio, have invented certain new and useful Improvements in Fish-Stops, of which the following is a specification.

This invention relates to fish stops, and more particularly to a fish stop which is especially adapted to be mounted in an irrigation ditch so as to prevent entrance of fish into the same.

One of the main objects of the invention is to provide a fish stop of very simple construction and operation which may be produced at small cost and is so made as to be readily applied to an irrigation ditch of ordinary construction. A further object is to provide a stop which will permit free flow of the water through the same while preventing passage of fish, this stop having a movable closure member which may be actuated by the water pressure to permit passage of foreign material through the stop so as to prevent clogging of the same. A further object is to provide a stop having closure grilles one of which is inclined upwardly and rearwardly of the stop, the upper grille being inclined downwardly and rearwardly and movable so as to permit lifting thereof by foreign material so as to prevent clogging of the stop. Further objects will appear from the detailed description.

In the drawings:

Figure 1 is an end view of the stop taken from what might be termed the rearward or down stream end, Fig. 2 is a longitudinal vertical section, Fig. 3 is a fragmentary side view.

The body or main frame 1 of the stop is formed from a continuous piece of sheet metal which is bent to provide the bottom 2 and vertical side walls 3 and 4, the frame or casing thus produced being of substantially U-shape in transverse cross section. The upper edge of each of the side walls is inclined downwardly and rearwardly, and the upper rear corner of each section is bent or arched outwardly to provide an arcuate pointed element 5. These elements 5 project laterally of the main casing and are positioned at such a height as to engage into the banks or walls of the ditch in which the casing is mounted thus serving as anchoring or locking members which act to prevent rearward movement of the casing in the ditch.

The forward portion of the bottom is turned upwardly at right angles to provide a front retaining flange 6. This flange has its ends secured to tabs 7 which are turned inwardly from the side walls, so as to be braced thereby. A block 8 is secured in the casing on the bottom 2 thereof adjacent the inner face of flange 6 and extends the full width of the casing. This block serves as a supporting member for a lower closure grille designated generally by 9 which is composed of a plurality of parallel spaced rods 10, the lower ends of which are fixedly secured in the block, as in Fig. 2. The upper end of each of these rods is turned over to provide an eye 11, and the upper ends of the rods are secured together by means of a tie member 12 which is secured through the eyes of the rods. The grille thus formed is inclined upwardly and rearwardly of the casing at an angle of approximately 45°, and is braced against rearward and downward movement by means of the vertical brace rods 13 secured to bottom 2 and having their upper ends secured to the tie member 12. The grille 9 thus produced coöperates with a similar grille 14 which is carried by a roller 15 rockably supported adjacent the upper edges of side walls 3 and 4. Normally, the lower edge of grille 14 rests upon the upper edge of grille 9, the two grilles thus constituting a substantially V-shaped closure member which serves to permit free passage of water through the stop while preventing passage of fish, it being understood, of course, that the bars or rods of the grilles are so spaced as to effectually eliminate all possibility of fish of any appreciable size passing between these rods, or between the grille elements and the side walls of the casing.

A brace strap 16 is mounted at the top of the casing and extends transversely thereof. The ends of this strap are turned downward at right angles to provide tabs 17 which project downwardly across the outer faces of the side walls. Shaft 18, upon which roller 15 is secured, is extended through the side walls of the casing and through these tabs 17 so as to be rockably supported thereby, the walls of the casing and the tabs thus providing supporting members of sufficient strength to support the shaft and roller, and the shaft serving to secure the brace strap 16 in proper position to prevent spreading apart of the side walls of the casing. One end portion of shaft 18 is squared as at 19 to receive an arm 20 secured thereon. This arm projects rearwardly of the casing and is provided at its rearward end with an opening through which is secured one end of a tension coil spring 21, the other end of which is secured through an eye 22 secured to wall 3 of the casing. Spring 21 acts to rotate the shaft 18, and consequently roller 15, downwardly and rearwardly thus normally holding the upper grille 14 in lowered or closed position. Any foreign material which may flow into the front of the casing will engage the upwardly and rearwardly inclined rods 10 of the lower grille, or the downwardly inclined rods of upper grille, according to the height of the water level, the material being thus directed to the apex of the V formed by these grilles. If any appreciable quantity of foreign material collects at the apex of the grille members, which will be at the lower end of grille 14, the pressure of the water upon this material will be sufficient to raise the upper grille slightly due to the relatively great leverage exerted thereby on the rods of the upper grille, thus permitting these materials to escape between the grilles into the ditch. This effectually prevents all clogging of the stop such as would interfere to any appreciable extent with the free flow of water therethrough.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In a fish stop, the combination with a substantially U-shaped casing adapted to be inserted in an irrigation ditch; of a grille fixedly mounted therein and inclined from the bottom of the casing upward and rearward, a second grille above the first and inclined from the top of the casing downward and rearward, a pivotal support for the upper end of the second grille, and yielding means drawing the lower end of said second grille normally downward and into contact with the upper end of the first grille, for the purpose set forth.

2. In a fish stop, the combination with a substantially U-shaped casing adapted to be inserted in an irrigation ditch; of a grille supported at its front end at the bottom of the casing and inclining thence upward and rearward; a roller mounted across the top of the casing at its front end, a second grille mounted at its front end in said roller and its rear end normally resting on the rear end of the first grille, and a spring turning said roller in a direction to maintain the relative position of said grilles but permit the rise of the lower end of the upper grille, as described.

3. In a fish stop, the combination with a substantially U-shaped sheet metal casing, a strap across the upper edges of its side walls and downturned into tabs outside said walls, a shaft journaled through said walls and tabs and having a crank arm on one end, and a spring connecting said arm with a fixed point on one wall, of a grille rising from the bottom of the casing and inclining rearward and upward, means for supporting said grille fixedly, a roller fast on said shaft within the casing, and a second grille connected with said roller and inclining normally rearward and downward into contact with said first-mentioned grille, the tension of said spring normally maintaining such contact, for the purpose set forth.

In testimony whereof I affix my signature in presence of two witnesses.

ANDREW DRESHER.

Witnesses:
E. S. LUSK,
EMMETT D. LUSK.

Copies of this patent may be obtained for five cents each, by addressing the "Commissioner of Patents, Washington, D. C."